United States Patent [19]

Muehlbach et al.

[11] Patent Number: 4,914,144

[45] Date of Patent: Apr. 3, 1990

[54] HALOGEN-FREE FLAMEPROOF MOLDING MATERIALS

[75] Inventors: Klaus Muehlbach, Heppenheim; Graham E. McKee, Weinheim; Hermann Brandt, Schiffestadt; Dieter W. Blum, Limburgerhof, all of Fed. Rep. of Germany

[73] Assignee: BASF Aktiengesellschaft, Ludwigshafen, Fed. Rep. of Germany

[21] Appl. No.: 285,662

[22] Filed: Dec. 16, 1988

[30] Foreign Application Priority Data

Dec. 17, 1987 [DE] Fed. Rep. of Germany ....... 3742768

[51] Int. Cl.$^4$ ............................................... C08K 5/53
[52] U.S. Cl. .................................... 524/139; 524/141; 524/145
[58] Field of Search ......................... 524/139, 141, 145

[56] References Cited

U.S. PATENT DOCUMENTS 4,692,488  9/1987  Kress et al. .......................... 524/140

FOREIGN PATENT DOCUMENTS 0146023  6/1985  European Pat. Off. .
3523316  1/1987  Fed. Rep. of Germany .
1459648  12/1976  United Kingdom .

*Primary Examiner*—Veronica P. Hoke
*Attorney, Agent, or Firm*—Oblon, Spivak, McClelland, Maier & Neustadt

[57] ABSTRACT

A flameproof, halogen-free thermoplastic molding material contains, based on the molding material consisting of A, B, C, D and E,
(A) 40 to 95% by weight of a thermoplastic halogen-free aromatic polycarbonate based on a diphenol,
(B) from 5 to 30% by weight of one or more halogen-free graft polymers obtained from, based on B, (b$_1$) an elastomer (rubber), which accounts for from 40 to 80% by weight, and
(b$_2$) a graft shell on this elastomer which accounts for from 20 to 60% by weight,
(C) from 5 to 50% by weight of one or more halogen-free thermoplastic copolymers consisting of, based on C, from 50 to 95% by weight of styrene, α-methylstyrene, styrene which is substituted in the nucleus, methyl methacrylate or a mixture of these, and from 50 to 5% by weight of (meth)acrylonitrile, methyl methacrylate, maleic anhydride, N-substituted maleimide or a mixture of these,
(D) 1 to 25% by weight of one or more halogen-free phosphorus compounds of the formula

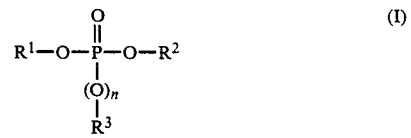

where $R^1$, $R^2$ and $R^3$ independently of one another are each halogen-free $C_1$–$C_8$-alkyl or halogen-free $C_6$–$C_{20}$-aryl and n is 0 or 1, and
(E) from 0.05 to 5% by weight of a tetrafluoroethylene polymer. In the molding material, the elastomer (b$_1$) is prepared by polymerizing a monomer mixture of (b$_{1a1}$) from
70 to 99.9% by weight, based on b$_1$), of one or more alkyl acrylates where alkyl is of 1 to 8 carbon atoms,
(b$_{1a2}$) from 0 to 30% by weight, based on (b$_1$), of one or more further copolymerizable monoethylenically unsaturated monomers
and b$_{1a3}$) from 0.1 to 5% by weight, based on B$_1$), of a copolymerizable polyfunctional, crosslinking monomer.

The molding material is used for the production of shaped articles.

7 Claims, No Drawings

HALOGEN-FREE FLAMEPROOF MOLDING MATERIALS

The present invention relates to a flameproof, halogen-free thermoplastic molding material consisting of a polycarbonate, a graft copolymer, a copolymer, a phosphorus compound and a tetrafluoroethylene polymer.

The relevant prior art includes:
(1) British Patent 1,459,648,
(2) U.S. Pat. No. 4,692,488,
(3) German Laid-Open Application DOS 3,523,316 and
(4) European Patent 146,023.

Most known flameproof blends of ABS and polycarbonate contain halogen-containing flameproofing agents, which results in the release of toxic, halogenated compounds in the event of a fire or of carbonization. Extensive information in this connection is to be found in (2).

(1) describes flame-retardant, non-dripping polymers, for example ABS polymers or polycarbonates, with which a flameproofing additive, for example triphenyl phosphate, a noncombustible fiber material and polytetrafluoroethylene resin have been mixed. Example 2 of the patent shows that polytetrafluoroethylene resin without added fibers does not prevent dripping.

The molding materials described in (2) and (3) and consisting of PC, styrene/acrylate copolymers (small amounts of graft rubber), phosphates and PTFE do not contain any halogen compounds having labile halogen. Hence, they can also be used in the electrical and electronics industry but have completely inadequate toughness in notched test specimens.

(4) describes halogen-free, flameproof blends of polycarbonate, styrene homopolymers and copolymers and graft rubbers based on ABS or ASA. However, some of the known blends are based on tetramethylbisphenol A and are sensitive to heat and difficult to process.

The few halogen-free blends [cf. (1) to (4)], however, either possess inadequate toughness [cf. (2) or (3)] or are difficult to process [cf. (4)] or have insufficient resistance to weathering and yellowing.

It is an object of the present invention to overcome the disadvantages described above.

We have found that this object is achieved by a molding material as claimed in claim 1.

The present invention relates to a flameproof, halogen-free thermoplastic molding material containing, based on the molding material consisting of A, B, C, D and E, (A) 40 to 95% by weight of a thermoplastic halogen-free aromatic polycarbonate based on a diphenol of the formula

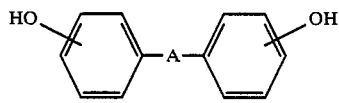 (I)

where A is a single bond, $C_1$–$C_3$-alkylene, $C_2$–$C_3$-alkylidene, $C_3$–$C_6$-cycloalkylidene, —S— or —$SO_2$—, (B) from 5 to 30% by weight of one or halogen-free graft polymers obtained from, based on B, ($b_1$) an elastomer (rubber), which accounts for from 40 to 80% by weight, and ($b_2$) a graft shell on this elastomer which accounts for from 20 to 60% by weight and is obtained from, based on ($b_2$), ($b_2a_1$) from 50 to 95% by weight of styrene, α-methylstyrene, styrene which is substituted in the nucleus, methyl methacrylate or a mixture of these, and ($b_2a_2$) from 50 to 5% by weight of (meth)acrylonitrile, methyl methacrylate, maleic anhydride, N-substituted maleimide or a mixture of these, (C) from 5 to 50% by weight of one or more halogen-free thermoplastic copolymers consisting of, based on C, from 50 to 95% by weight of styrene, α-methylstyrene, styrene which is substituted in the nucleus, methyl methacrylate or a mixture of these, and from 50 to 5% by weight of (meth)acrylonitrile, methyl methacrylate, maleic anhydride, N-substituted maleimide or a mixture of these, (D) 1 to 25% by weight of one or more halogen-free phosphorus compounds of the formula

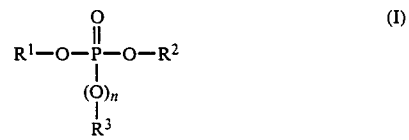

where $R^1$, $R^2$ and $R^3$ independently of one another are each halogen-free $C_1$–$C_8$-alkyl or halogen-free $C_6$–$C_{20}$-aryl and n is 0 or 1, and (E) from 0.05 to 5% by weight of a tetrafluoroethylene polymer. In the molding material, the elastomer ($b_1$) is prepared by polymerizing a monomer mixture of ($b_1a_1$) from 70 to 99.9% by weight, based on ($b_1$), of one or more alkyl acrylates where alkyl is of 1 to 8 carbon atoms, ($b_1a_2$) from 0 to 30% by weight, based on ($b_1$), of one or more further copolymerizable monoethylenically unsaturated monomers and ($b_1a_3$) from 0.1 to 5% by weight, based on ($b_1$), of a copolymerizable polyfunctional, crosslinking monomer.

In the novel molding material, component B is based on an acrylate rubber. The novel molding material has good toughness and good resistance to weathering and yellowing as well as excellent flame retardance. It was surprising that the use of graft rubbers based on an acrylate rubber results in substantially better flame retardance than the use of those based on a butadiene rubber. Blends with graft rubbers based on acrylate polymers are generally considered to be difficult to render flameproof since, in contrast to the corresponding butadiene rubbers, they do not undergo crosslinking at elevated temperatures and hence tend to drip flaming particles.

For the purposes of the present invention, blends which are considered to be halogen-free are those which do not contain any substances which liberate volatile halogen compounds at and above the decomposition temperature of the polymer matrix. Examples of these are the conventional halogen flamproofing agents. In contrast, according to this definition polytetrafluoroethylene is designated halogen-free since it is stable at the decomposition temperature of the polymer matrix.

Synthesis of the molding material from the components, their preparation and the preparation and use of the molding material are described below.

The molding material contains the components A to E and preferably consists of them. Depending on the application, a very wide range of additives may also be present.

The molding material contains the following amounts of the components, based in each case on A+B+C+D+E:

from 40 to 95, preferably from 45 to 85, not less than 50 to 80, % by weight of A, from 5 to 30, preferably from 5 to 25, not less than 5 to 20, % by weight of B, from 5 to 50, preferably from 5 to 40, not less than 5 to 30, % by weight of C, from 1 to 25, preferably from 3 to 20, not less than 5 to 18, % by weight of D and from 0.05 to 5, preferably from 0.05 to 2.5, not less than 0.05 to 1, % by weight of E.

From 0.05 to 100 parts by weight, based on 100 parts by weight of the molding material consisting of A+B+C+D+F, of conventional additives F may be present.

Component A

Thermoplastic halogen-free aromatic polycarbonates (A) which are suitable according to the invention are those based on diphenols of the formula (I)

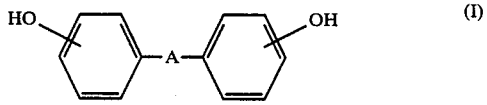

where A is a single bond, $C_1$–$C_3$-alkylene, $C_2$–$C_3$-alkylidene, $C_3$–$C_6$-cycloalkylidene, —S— or —$SO_2$—.

Polycarbonates A which are suitable according to the invention are both homopolycarbonates and copolycarbonates.

The diphenols of the formula (I) are either known from the literature or can be prepared by processes known from the literature.

The preparation of the polycarbonates A which are suitable according to the invention is known from the literature and can be effected, for example, by the phase boundary method using phosgene or in homogeneous phase using phosgene (ie. the pyridine method), the molecular weight to be obtained in each case being achieved in a known manner by means of an appropriate amount of known chain terminators. (Regarding polydiorganosiloxane-containing polycarbonates, reference may be made to, for example, German Laid-Open Application DOS 3,334,782).

Examples of suitable chain terminators are phenol and p-tert.-butylphenol as well as long-chain alkylphenols, such as 4-(1,3-tetramethylbutyl)-phenol, according to German Laid-Open Application DOS 2,842,005, or monoalkylphenols or dialkylphenols having a total of from 8 to 20 carbon atoms in the alkyl substituents, according to German Patent Application P 35 06 472.2 (Le A 23 654), for example p-nonylphenol, 3,5-di-tert.-butylphenol, p-tert.-octylphenol, p-dodecylphenol, 2-(3,5-dimethylheptyl)-phenol and 4-(3,5-dimethylheptyl)-phenol.

The polycarbonates A which are suitable according to the invention have relative viscosities $\eta_{rel}$ of from 1.10 to 1.50, in particular from 1.25 to 1.40, ml/g. This corresponds to mean molecular weights (Mw) of from 10,000 to 200,000, preferably from 20,000 to 80,000.

Suitable diphenols of the formula (I) are, for example, hydroquinone, resorcinol, 4,4'-dihydroxydiphenyl, 2,2-bis-(4-hydroxyphenyl)-propane, 2,4-bis-(4-hydroxyphenyl)-2-methylbutane and 1,1-bis-(4-hydroxyphenyl)-cyclohexane.

Preferred diphenols of the formula (I) are 2,2-bis-(4-hydroxyphenyl)-propane and 1,1-bis-(4-hydroxyphenyl)-cyclohexane.

The polycarbonates A which are suitable according to the invention may be branched in a conventional manner, preferably by the incorporation of from 0.05 to 2.0 mol %, based on the sum of the diphenols used, of trifunctional or polyfunctional compounds, for example those having three or more than three phenolic OH groups.

Preferred polycarbonates in addition to the bisphenol A homopolymer are the copolycarbonates of bisphenol A.

For the purposes of the present invention, halogen-free polycarbonates are the polycarbonates obtained from halogen-free diphenols, halogen-free chain terminators and, if required, halogen-free branching agents, the content of minor ppm amounts of hydrolyzable chlorine, resulting, for example, from the preparation of the polycarbonates with phosgene by the phase boundary method, not being regarded as making the compounds halogen-containing for the purposes of the present invention. Such polycarbonates containing ppm amounts of hydrolyzable chlorine are halogen-free polycarbonates for the purposes of the present invention.

Component B

The graft polymers B are known as ASA rubbers. Their preparation and their composition are described in, for example, German Laid-Open Applications DOS 2,826,925, DOS 3,149,358 and DOS 3,414,118.

Component B is preferably composed of:

($b_1$) one or more elastomers (rubbers) which account for from 40 to 80, preferably from 50 to 75, % by weight, based on (B), and is obtained by polymerization of a monomer mixture of ($b_1a_1$) from 70 to 99.9% by weight, based on ($b_1$), of one or more alkyl acrylates where alkyl is of 1 to 8 carbon atoms, ($b_1a_2$) from 0 to 30% by weight, based on ($b_1$), of one or more further copolymerizable monoethylenically unsaturated monomers and ($b_1a_3$) from 0.1 to 5% by weight, based on ($b_1$), of a copolymerizable polyfunctional, crosslinking monomer, and ($b_2$) a graft shell on this elastomer, which shell accounts for from 20 to 60, preferably from 25 to 50, % weight, based on (B), and is composed of ($b_2a_1$) from 50 to 95% by weight of styrene, α-methylstyrene, styrene which is substituted in the nucleus, methyl methacrylate or a mixture of these, and ($b_2a_2$) from 50 to 5% by weight of (meth)acrylonitrile, methyl methacrylate, maleic anhydride, N-substituted maleimide or a mixture of these.

Suitable monomers for the preparation of the elastomer ($b_1$) are:

($b_1a_1$) from 70 to 99.9, preferably 99, % by weight, based on ($b_1$), of an alkyl acrylate where alkyl is of 1 to 8 carbon atoms, preferably n-butylacrylate and/or 2-ethylhexyl acrylate, in particular n-butyl acrylate as the only alkyl acrylate.

($b_1a_2$) If necessary, the elastomeric polymer ($b_1$) may also contain up to 30, in particular from 20 to 30, % by weight, based on ($b_1$), of a further copolymerizable monomer $b_1a_2$, such as butadiene, isoprene, styrene, acrylonitrile, methyl methacrylate and/or vinyl methyl ether.

($b_1a_3$) In order to obtain crosslinked acrylate polymers, the polymerization of the acrylate is carried out in the presence of from 0.1 to 5, preferably from 1 to 4, % by weight, based on the total monomers used in the preparation of the grafting base, of a copolymerizable, polyfunctional, preferably bifunctional or trifunctional, monomer ($b_1a_3$) which effects crosslinking. Suitable bifunctional or polyfunctional crosslinking monomers ($b_1a_3$) of this type are monomers which preferably contain two, or, if necessary, three or more ethylenic double bonds which are capable of copolymerization and are not conjugated in the 1,3-positions. Examples of suitable crosslinking monomers are divinylbenzene, diallyl maleate, diallyl fumarate, diallyl phthalate, triallyl cyanurate and triallyl isocyanurate. The ester of acrylic acid with tricyclodecenyl alcohol has proven a particularly advantageous crosslinking monomer (cf. German Patent 1,260,135).

The rubbers are present in the graft polymers (B) in the form of partially or completely crosslinked particles having a median particle size of from 50 to 700 nm ($d_{50}$) value of the integrated mass distribution).

In order to calculate this, the particles of the rubber are enlarged in a known manner, for example by agglomeration, so that the latex is bimodal (50–180 nm and 200–700 nm).

The graft copolymer B can be prepared, for example, by the method described in German Patent 1,260,135.

The graft shell of the graft copolymer can be synthesized by a one-stage or two-stage process, the coarse-particled product preferably being synthesized in two stages (grafted).

Where the graft shell is synthesized in a one-stage process, a mixture of the monomers ($b_2a_1$) and ($b_2a_2$) in the deisred weight ratio of from 90:10 to 65:35 is polymerized in the presence of the elastomer $b_1$ in a conventional manner (cf. for example German Laid-Open Application DOS 2,826,925), preferably in emulsion.

Where the graft shell ($b_2$) is synthesized by a two-stage process, the 1st stage accounts for from 20 to 70, preferably from 25 to 50, % by weight, based on ($b_2$). For its preparation, only monoethylenically unsaturated aromatic hydrocarbons of not more than 12 carbon atoms ($b_2a_1$) are used.

The 2nd stage of the graft shell accounts for from 30 to 80, in particular from 50 to 75, % by weight, based on ($b_2$). For its preparation, mixtures of the stated monoethylenically unsaturated aromatic hydrocarbons ($b_2a_1$) and monoethylenically unsaturated monomers ($b_2a_2$) in a weight ratio ($b_2a_1$)/($b_2a_2$) of from 90:10 to 60:40, in particular from 80:20 to 70:30, are used.

Particularly preferably used monomer mixtures are styrene and acrylonitrile, α-methylstyrene and acrylonitrile, styrene, acrylonitrile and methyl methacrylate, and styrene and maleic anhydride.

The non-grafted parts of copolymers of the graft monomers ($b_2a_1$) and/or ($b_2a_2$), which parts are formed during the preparation of the graft copolymer (B), are included in component B for the purposes of the present invention.

The conditions of the graft copolymerization should be chosen so that particle sizes of from 50 to 700 nm ($d_{50}$ value of the integral mass distribution) result. The relevant measures are known and are described in, for example, German Patent 1,260,135 and German Laid-Open Application DOS 2,826,925.

In order to obtain very tough products, it is often advantageous to use a mixture of two or more graft copolymers having different particle sizes.

The chemical composition of the two graft copolymers $B_1$ and $B_2$ is preferably the same, although the shell of the coarse-particle graft copolymer can, in particular, also be synthesized in two stages.

In a preferred embodiment, a mixture of two graft copolymers having particle diameters ($d_{50}$ value of the integral mass distribution) of from 50 to 180 nm and from 200 to 700 nm are used in a weight ratio of from 70:30 to 30:70.

Mixtures of components A and B, the latter having a coarse-particle and a fine-particle graft copolymer, are described in, for example, German Laid-Open Application DOS 3,615,607. Mixtures of components A and B, the latter having a two-stage graft shell, are disclosed in European Patent 111,260.

Component C

Preferred halogen-free copolymers (C) are those which comprise one or more monomers from the series consisting of styrene, α-methylstyrene, alkylstyrene and methyl methacrylate with one or more monomers from the series consisting of acrylonitrile, methacrylonitrile, methyl methacrylate and maleic anhydride.

Copolymers (C) are frequently formed as byproducts in the graft polymerization for the preparation of component (B), particularly when large amounts of monomers are grafted onto small amounts of rubber.

The copolymers (C) are resin-like, thermoplastic and rubber-free. Particularly preferred copolymers (C) are those of styrene with acrylonitrile and, if required, with methyl methacrylate, of α-methylstyrene with acrylonitrile and, if required, with methyl methacrylate or of styrene and α-methylstyrene with acrylonitrile and, if required, with methyl methacrylate and of styrene and maleic anhydride.

Particularly preferred weight ratios in the thermoplastic copolymer (C) are from 60 to 80% by weight of the vinylaromatic monomer and from 40 to 20% by weight of the ethylenically unsaturated monomer. It is also possible simultaneously to use a plurality of the copolymers described.

The copolymers (C) are known and can be prepared by free radical polymerization, in particular by emulsion, suspension, solution or mass polymerization. The copolymers (C) have viscosity numbers of from 40 to 160, preferably from 60 to 100, [ml/g], corresponding to molecular weights $\overline{M}_w$ of from 15,000 to 200,000.

Component D

The halogen-free phosphorus compounds (D) which are suitable according to the invention are generally known (see, for example, Ullmann, Enzyklopädie der technischen Chemie, Vol. 18, page 301 et seq., 1979, Houben-Weyl, Methoden der organischen Chemie, Vol. 12/1, pages 43 and 136; Beilstein, Vol. 6, page 177).

Phosphorus compounds (D) of the formula (I) which are suitable according to the invention are, for example, tri-(2,6-dimethylphenyl)phosphate, triphenyl phosphate, tricresyl phosphate, diphenyl 2-ethylcresyl phosphate, diphenyl cresyl phosphate, tri-(isopropylphenyl)-phosphate, diphenyl methanephosphonate, diphenyl phenylphosphonate, triphenylphosphine oxide, tricresylphosphine oxide and tri-(2,6-dimethylphenyl)-phosphine oxide.

Component E

The tetrafluoroethylene polymers (E) which are suitable according to the invention are polymers having fluorine contents of from 70 to 76% by weight. Examples are polytetrafluoroethylene, tetrafluoroethylene/-hexafluoropropylene copolymers and tetrafluoroethylene copolymers with small amounts of fluorine-free copolymerizable ethylenically unsaturated monomers.

These polymers are known. They can be prepared by known processes, for example by polymerization of tetrafluoroethylene in an aqueous medium using a catalyst which forms free radicals, for example sodium peroxydisulfate, potassium peroxydisulfate or ammonium peroxydisulfate, under from 7 to 70 kg/cm² and at from 0° to 200° C., preferably from 20° to 100° C. (U.S. Pat. No. 2,534,058). The polytetrafluoroethylene powders obtained from suspensions or emulsions prepared in this manner, by coagulation or by precipitation and, if required, by subsequent milling, can have particle sizes of form 0.05 to 200 μm. Those having median particle sizes of from 0.1 to 20 μm are preferably used.

A suitable polytetrafluoroethylene is, for example, Hostaflon TF 2026 ® from Hoechst. The tetrafluoroethylene polymers can have molecular weights of from 50,000 to 10,000,000 ($\overline{M}_n$, weight average molecular weights obtained by terminal group determination according to R. C. Doban, 130. Meeting of the American Chemical Society, Altantic City, September 1956). The densities are from 1.2 to 1.9 [g/cm³].

The tetrafluoroethylene polymers can be added to the mixture in the form of a powder or in prebatched form, the latter being preferred. To do this, for example, the emulsions of the graft rubber (B) and of the tetrafluoroethylene polymers (E) are mixed with one another and coagulated together. In another variant, the aqueous emulsion of the tetrafluoroethylene polymer is pumped into an extruder, into the screw zone containing copolymer (C), and the water is separated off by devolatilization under reduced pressure.

Component F

The molding material can also contain conventional additives. Examples are
carbon fibers, glass fibers, etc.

The glass fibers used may be of E, A or C glass. They are preferably provided with a size and an adhesion promoter. Their diameter is in general from 6 to 20 μm. Both rovings and chopped glass fibers having a length of from 1 to 10 mm, preferably from 3 to 6 mm, can be used.

Fillers or reinforcing substances, such as glass spheres, mineral fibers, whiskers, alumina fibers, mica, powdered quartz, wollastonite, etc.

Metal flakes (eg. aluminum flakes from Transmet Corp.), metal powders, metal fibers, metal-coated fillers (eg. nickel-coated glass fibers) and other additives which screen electromagnetic waves. Al flakes (K 102 from Transmet) in amounts of from 30 to 70 parts by weight, based on the flameproof molding material consisting of 100 parts by weight of A to E, are particularly suitable for EMI purposes; mixtures of this material with additional carbon fibers or conductivity carbon black or nickel-coated carbon fibers are also suitable.

The novel molding materials may also contain further additives which are typical of, and conventionally used in, polycarbonates, SAN polymers and graft copolymers based on ASA, etc., or mixtures of these. Examples of such additives are, dyes, pigments, antistatic agents, antioxidants and, in particular, the lubricants required for further processing of the molding material, for example in the production of moldings or shaped articles. Preparation of the molding material The novel molding material is prepared by mixing the components. It may be advantageous to premix individual components. It is also possible to mix the components in solution and remove the solvents.

Suitable organic solvents for components (A) to (E) and the additives of group (F) are, for example, chlorobenzene, mixtures of chlorobenzene and methylene chloride or mixtures of chlorobenzene and aromatic hydrocarbons, eg. toluene.

The solvent mixtures can be evaporated, for example, in devolatilizing extruders.

For example, dry components A, B, C, D, E and, if required, F can be mixed by any known method. Peferably, however, the said components are mixed at from 200° to 320° C. by extruding, kneading or rolling the components together, the components having had to be isolated before-hand from the solution obtained in the polymerization or from the aqueous dispersion. The graft copolymerization products (component B) obtained in aqueous dispersion can be coagulated together with the emulsion of component E, precipitated and partially dewatered, or mixed directly as a dispersion with component C and then with the polycarbonate A and component D, in which case complete drying of components B and E takes place during mixing. Furthermore, the emulsion of component E can be drawn into a melt of component C with devolatilization in an extruder, and the further components A, B and D can metered in in the same extruder after devolatilization.

Suitable mixing apparatuses for carrying out the novel process are, for example, conventional drum mixers or stirred mixers.

Suitable apparatuses for compounding the melt are, for example, heated internal kneaders with or without a ram and operating batchwise, continuous internal kneaders, screw kneaders having axial oscillating screws, twin-screw extruders and roll mills having heated rolls.

Suitable apparatuses for the melt extrusion are, for example, single-screw and twin-screw extruders.

The novel molding material can be processed by a conventional method for processing thermoplastics, for example by extrusion, injection molding, calendering, blow forming of hollow bodies, pressing or sintering. The molding materials prepared by the novel process are particularly preferably used for producing shaped articles by injection molding for automotor construction, the building industry, office machines, electrical appliances and household appliances.

The parameters described in the present patent are determined as follows:
1. the median particle size and the particle size distribution were determined from the integral mass ditribution. The median particle sizes have always the weight average of the particle sizes, determined using an analytical ultracentrifuge by the method described by W. Scholtan and H. Lange, Kolloid-Z. and Z.-Polym. 250 (1972), 782–796. The ultracentrifuge measurement gives the integral mass distribution of the particle diameter of a sample. This gives the percentage by weight of the particles which have a diameter equal to or smaller than a certain size. The median particle diameter, which is also referred to as the $d_{50}$ value of the integral mass distribution, is defined as the particle diameter for which 50% by weight of the particles have a smaller diameter than the diameter corresponding to the $d_{50}$ value. In this case, 50% by weight of the particles have a larger diameter than the $d_{50}$ value. To characterize the width of the particle size distribution of the rubber particles, the $d_{10}$ and $d_{90}$ values obtained from the integral mass distribution are used in addition to the $d_{50}$ value (median particle diameter). The $d_{10}$ and $d_{90}$ values of the integral mass distribution are defined similarly to the $d_{50}$ value, except that they are based on 10 and 90% by weight of the particles, respectively. The quotient $$\frac{d_{90} - d_{10}}{d_{50}} = Q$$

is a measure of the width of the particle size distribution.

2. The notched impact strength, $a_K$, in [kJ/m$^2$], was measured according to DIN 53,453 at 23° C. on standard small bars injection molded at 250° C. The impact strengths of comparative samples and of samples of the novel molding material are summarized in the Table.

3. (a) The relative solution viscosity $\eta_{rel}$ of the polycarbonate used was measured in a 0.5% strength solution in methylene chloride at 23° C.;

(b) the viscosity number, VN, of the copolymers C was measured in 0.5% strength solution in dimethylformamide at 23° C.

4. The flameproofing test is carried out as a vertical fire test according to the specifications of the Underwriter Laboratories for classification in one of the fire classes UL 94 V0, V1 or V2.

A flameproofed thermoplastic is classified in fire class UL 94 V0 if the following criteria are met: In a set of 5 specimens measuring 127×12.7×3.16 mm, none of the specimens must continue burning for more than 10 seconds after application of an open flame (height 19 mm) twice for 10 seconds. The total combustion time for 10 flame applications to 5 specimens must not exceed 50 seconds. There must be no dripping of flaming particles, complete combustion or drawing combustion lasting longer than 30 seconds. Classification in fire class Ul 94 V1 requires that the combustion time be no longer than 30 seconds and that the total combustion times of 10 flame applications to 5 specimens be no longer than 250 seconds. Drawing combustion must not last longer than 60 seconds. The remaining criteria are identical to the abovementioned ones. A material is classified in fire class Ul 94 V2 when dripping of flaming particles occurs but the other criteria for classification as UL 94 V1 are fulfilled.

4. The total penetration energy, $W_{tot}$, in the Plastechon test (Nm) was determined according to DIN 53,453 on 2 mm thick round disks injection molded at 250° C. The test was carried out at room temperature (23° C.).

5. The resistance to yellowing was determined visually by comparison. For this purpose, 60 mm round disks were exposed in a Xenon test apparatus at room temperature for 60 hours and the color of the test specimens was compared with the color of those stored in the dark.

The products described below were used for the preparation of the novel molding materials and materials for comparative experiments.

Component A

A commercial polycarbonate based on bisphenol A and having a relative solution viscosity of 1.30 ml/g was used as component A.

Component B

The graft copolymers described below were used as component B.

(a) Preparation of the finely divided graft copolymer $B_1$.

($a_1$) 16 parts of butyl acrylate and 0.4 part of tricyclodecenyl acrylate in 150 parts of water were heated to 60° C. with the addition of one part of the sodium salt of a $C_{12}$–$C_{18}$-paraffinsulfonic acid, 0.3 part of potassium persulfate, 0.3 part of sodium bicarbonate and 0.15 part of sodium pyrophosphate, while stirring. 10 minutes after the polymerization reaction had begun, a mixture of 82 parts of butyl acrylate and 1.6 parts of tricyclodecenyl acrylate was added in the course of 3 hours. When the addition of the monomers was complete, the reaction was allowed to continue for a further hour. The resulting latex of the crosslinked butyl acrylate polymer had a solids content of 40% by weight. The median particle size (weight average) was determined as 76 nm. The particle size distribution was narrow (quotient Q=0.29).

($a_2$) 150 parts of the polybutyl acrylate latex obtained according to ($a_1$) were mixed with 40 parts of a mixture of styrene and acrylonitrile (weight ratio 75:25) and 60 parts of water and the stirred mixture was heated at 65° C. for 4 hours, after the addition of a further 0.03 part of potassium persulfate and 0.05 part of lauroyl peroxide. When the graft copolymerization was complete, the polymerization product was precipitated from the dispersion by means of calcium chloride solution at 95° C., washed with water and dried in a stream of warm air. The degree of grafting of the graft copolymer was 35%, and the particle size was 91 nm.

(b) Preparation of a coarse-particled graft copolymer $B_2$ ($b_1$) 1.5 parts of the latex prepared in stage ($a_1$) were initially taken, 50 parts of water and 0.1 part of potassium persulfate were added and then a mixture of 49 parts of butyl acrylate and 1 part of tricyclodecenyl acrylate on the one hand and a solution of 0.5 part of the sodium salt of a $C_{12}$–$C_{18}$-paraffinsulfonic acid in 25 parts of water on the other hand were run in at 60° C. in the course of 3 hours. When the addition was complete, polymerization was continued for 2 hours. The resulting latex of the crosslinked butyl acrylate polymer had a solids content of 40%. The median particle size (weight average of the latex) was determined as 430 nm. The particle size distribution was narrow (Q=0.1).

($b_2$) 150 parts of this latex were mixed with 20 parts of styrene and 60 parts of water, a further 0.03 part of potassium persulfate and 0.05 part of lauroyl peroxide were added and the stirred mixture was then heated at 65° C. for 3 hours. The dispersion obtained in this graft copolymerization was then polymerized with 20 parts of a mixture of styrene and acrylonitrile in a ratio of 75:25 for a further 4 hours. The reaction product was then precipitated from the dispersion by means of a calcium chloride solution at 95° C., separated off, washed with water and dried in a stream of warm air. The degree of grafting of the graft copolymer was determined as 35%; the median particle size of the latex particles was 510 nm.

(c) Preparation of the graft copolymer $B_3$ (comparison)

By polymerizing 60 parts of butadiene in the presence of a solution of 0.6 part of tert.-dodecylmercaptan, 0.7 part of Na $C_{14}$-alkylsulfonate as an emulsifier, 0.2 part of potassium peroxodisulfate and 0.2 part of sodium pyrophosphate in 80 parts of water, a polybutadiene latex was prepared at 65° C. When the reaction was complete, the polymerization autoclave was let down. The conversion was 98%.

A polybutadiene whose median particle size is 0.1 μm was obtained. The resulting latex was agglomerated by adding 25 parts of an emulsion of a copolymer of 96 parts of ethyl acrylate and 4 parts of methacrylamide, having a solids content of 10 parts by weight, a polybutadiene latex having a median particle size of 0.35 μm being formed. After the addition of 40 parts of water, 0.4 part of Na $C_{14}$-alkylsulfonate and 0.2 part of potassium peroxodisulfate, 40 parts of a mixture of styrene and acrylonitrile in a ratio of 70:30 were introduced in the course of 4 hours. The polymerization was carried out while stirring the mixture at 75° C. The conversion, based on styrene/acrylonitrile, was virtually quantitative. The resulting graft rubber dispersion was precipitated using calcium chloride solution, and the graft copolymer isolated was washed with distilled water.

Component C

The following copolymers were prepared by continuous solution polymerization by a method as described in, for example, Kunststoff-Handbuch, Vieweg-Daumiller, Volume V (Polystyrol), Carl-Hanser Verlag, Munich 1969, page 124, line 12 et seq.:

$C_1$: styrene/acrylonitrile, 80:20 VN=83 ml/g
$C_2$: α-methylstyrene/acrylonitrile, 70:30 VN=58 ml/g
$C_3$: styrene/maleic anhydride, 76:24 VN=65 ml/g.

Component D

Triphenyl phosphate: $D_1$

Tri(2,6-dimethylphenyl)phosphate: $D_2$

Component E

Starting from a Teflon dispersion having a solids content of 10% by weight, a density of the sintered solid of 2.23 g/cm³ and a particle size of 0.23 μm (Dupont, type 30N), 2 different batches of the tetrafluoroethylene polymer with copolymers were prepared.

$E_1$: Coagulated mixture of tetrafluoroethylene polymer and graft rubber $B_2$, weight ratio 1.2:98.8 Preparation of $E_1$): The emulsion of the tetrafluoroethylene polymer was mixed with the emulsion of the SAN graft polymer $B_2$ and stabilized with 0.4% by weight, based on polymer solids, of phenolic antioxidants. The mixture was coagulated with an aqueous solution of $MgSO_4$ (magnesium sulfate) at from 85° to 95° C., filtered and washed until virtually free of electrolyte, and then freed from the major part of water by centrifuging and dried at 100° C. to give a powder. This powder could then be compounded with the further components in the apparatuses described.

$E_2$: Tetrafluoroethylene polymer batch in styrene/acrylonitrile copolymer

In a twin-screw extruder from Werner & Pfleiderer, the styrene/acrylonitrile copolymer $C_1$ was melted and the Teflon dispersion was pumped into the melt. Water was removed along the extruder. The melt was extruded, drawn through a waterbath and granulated. The granules contained 2% by weight of Teflon.

The Examples and Comparative Experiments which follow illustrate the invention. In the Examples, parts are by weight.

EXAMPLES 1 TO 5 AND COMPARATIVE EXPERIMENTS I TO III

Components A to E were mixed in dry form and in the number of parts by weight shown in Table 1 in a fluid mixer and the mixture was extruded at 260° C. in a twin-screw extruder (ZSK 30 from Werner & Pfleiderer). The dried granules of the samples were converted into moldings for testing the properties [standard small bars having a sawn notch, fire bars 1/16" thick, 2 mm round disks (diameter 60 mm)] by injection molding at 250° C.

The properties of the blends are summarized in Table 2.

TABLE 1

| Example | A Amount | B Type | B Amount | C Type | C Amount | D Type | D Amount | E Type | E Amount | Content of PTFE copolymer in % by weight |
|---|---|---|---|---|---|---|---|---|---|---|
| 1 | 65 | $B_2$ | 8 | $C_1$ | 14.2* | $D_1$ | 12.5 | $E_2$ | 14.5 | 0.3 |
| 2 | 65 | $B_2$ | 8 | $C_1$ | 4.5 + 9.8* | $D_1$ | 12.5 | $E_2$ | 10.0 | 0.2 |
| 3 | 65 | $B_1 + B_2$ | 3 + 7 | $C_2 + C_1$ | 6 + 4.9* | $D_1$ | 14 | $E_2$ | 5.0 | 0.1 |
| 4 | 65 | $B_2$ | 8** | $C_1$ | 14.5 | $D_1$ | 12.5 | $E_1$ | 8.1 | 0.1 |
| 5 | 65 | $B_2$ | 8 | $C_3$ | 9.5 + 4.9* | $D_1$ | 12.5 | $E_2$ | 5.0 | 0.1 |
| 6 | 65 | $B_2$ | 7 | $C_2 + C_1$ | 8.5 + 4.9* | $D_2$ | 1.5 | $E_2$ | 5.0 | 0.1 |

| Comparative Experiments Example | A Amount | B Type | B Amount | C Type | Amount | | | | | |
|---|---|---|---|---|---|---|---|---|---|---|
| I | 65 | $B_3$ | 5 | $C_2 + C_1$ | 14 + 4.9* | 11 | 5 | | | 0.1 |
| II | 65 | $B_3$ | 10 | $C_2 + C_1$ | 6 + 4.9* | 14 | 5 | | | 0.1 |
| III | 65 | $B_3$ | 8 | $C_3 + C_1$ | 10 + 4.9* | 12 | 5 | | | 0.1 |
| IV | 55 | $B_2$ | 15.5 | $C_2$ | 16 | 9*** | 4.5 | | | 0 |

*introduced via batch $E_2$
**introduced via batch $E_1$
***according to EP-A-1 201 763
[1] polypentabromobenzyl acrylate + 4.5 of $Sb_2O_3$, the latter being introduced as a 90% strength batch in polyethylene

TABLE 2

| Example | $a_K$ RT kJ/m$^2$ | Wg (RT) Nm | UL 94 classification 1/16" bar | Yellowing[1] |
|---|---|---|---|---|
| 1 | 17.3 | 64.1 | V0 | + |
| 2 | 19.5 | 69.6 | V0 | + |
| 3 | 34.0 | 66.4 | V0 | + |
| 4 | 26.3 | 78.2 | V0 | + |
| 5 | 24.3 | 67.1 | V0 | + |
| 6 | 50.4 | 70.9 | V0 | + |
| Comparative Experiment | | | | |
| I | 4.3 | 69.0 | V2 | − |
| II | 30.8 | 56.4 | V2 | − |
| III | 25.2 | 60.9 | V1 | − |
| IV | 30.7 | 22.4 | V0 | + |

[1] +no color difference between exposed and unexposed round disks
−substantial color difference (yellowish tinge) between exposed and unexposed round disks.

We claim:

1. A flameproof, thermoplastic molding material consisting, based on the sum of A, B, C, D and E, essentially of (A) 40 to 95% by weight of a thermoplastic halogen-free aromatic polycarbonate based on a diphenol of the formula (I)

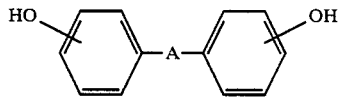

where A is a single bond, $C_1$-$C_3$-alkylene, $C_2$-$C_3$-alkylidene, $C_3$-$C_6$-cycloalkylidene, —S— or —SO$_2$—, (B) from 5 to 30% by weight of one or more halogen-free graft polymers obtained from, based on (B),
(b$_1$) an elastomer (rubber), which accounts for from 40 to 80% by weight, and
(b$_2$) a graft shell on this elastomer which accounts for from 20 to 60% by weight and is obtained from, based on (b$_2$),
(b$_2$a$_1$) from 50 to 95% by weight of styrene, α-methylstyrene, styrene which is substituted in the nucleus, methyl methacrylate or a mixture of these, and
(b$_2$a$_2$) from 50 to 5% by weight of (meth)acrylonitrile, methyl methacrylate, maleic anhydride, N-substituted maleimide or a mixture of these, (C) from 5 to 50% by weight of one or more halogen-free thermoplastic copolymers consisting of, based on C, from 50 to 95% by weight of styrene, α-methylstyrene, styrene which is substituted in the nucleus, methyl methacrylate or a mixture of these, and from 50 to 5% by weight of (meth)acrylonitrile, methyl methacrylate, maleic anhydride, N-substituted maleimide or a mixture of these, (D) 1 to 25% by weight of one or more halogen-free phosphorus compounds of the formula

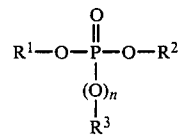

where R$^1$, R$^2$ and R$^3$ independently of one another are each halogen-free C$_1$-C$_8$-alkyl or halogen-free C$_6$-C$_{20}$-aryl and n is 0 or 1, and (E) from 0.05 to 5% by weight of a tetrafluoroethylene polymer, wherein the elastomer (b$_1$) is prepared by polymerizing a monomer mixture of
(b$_1$a$_1$) from 70 to 99.9% by weight, based on b$_1$), of one or more alkyl acrylates where alkyl is of 1 to 8 carbon atoms,
(b$_1$a$_2$) from 0 to 30% by weight, based on (b$_1$), of one or more further copolymerizable monoethylenically unsaturated monomers
and (b$_1$a$_3$) from 0.1 to 5% by weight, based on (b$_1$), of a copolymerizable polyfunctional, crosslinking monomer.

2. A molding material as claimed in claim 1, which contains the components in the following amounts:
from 45 to 85% by weight of component A,
from 5 to 25% by weight of component B,
from 5 to 40% by weight of component C,
from 3 to 20% by weight of component D, and
from 0.05 to 2.5% by weight of component F.

3. A molding material as claimed in claim 1, which contains the components in the following amounts:
from 50 to 80% by weight of component A,
from 5 to 20% by weight of component B,
from 5 to 30% by weight of component C,
from 5 to 18% by weight of component D, and
from 0.05 to 1% by weight of component E.

4. A molding material as claimed in claim 1 consisting of the components A to E.

5. A molding material as claimed in claim 1, which additionally contains conventional additives (component F).

6. A molding material as claimed in claim 1, wherein (component B) consists of a first, coarse-particled graft copolymer which has a median particle size of from 200 to 700 nm (d$_{50}$ value of the integral mass distribution), in an amount of from 30 to 70% by weight, based on (B), and a second, finely divided graft copolymer which has a median particle size of from 50 to 180 nm (d$_{50}$ value of the integral mass distribution), in an amount of from 70 to 30% by weight, based on (B).

7. A molding material as claimed in claim 5, which contains from 5 to 80 parts by weight, based on 100 parts by weight of the sum of the components A to E, of glass fibers, carbon fibers, reinforcing materials and fillers and metal flakes, metal powder, metal fibers or metal-coated glass fibers or a mixture thereof (component F).

* * * * *

UNITED STATES PATENT AND TRADEMARK OFFICE
CERTIFICATE OF CORRECTION

PATENT NO. : 4,914,144
DATED : April 3, 1990
INVENTOR(S) : Klaus MUEHLBACH, et al It is certified that error appears in the above-identified patent and that said Letters Patent is hereby corrected as shown below:

On the title page, item [75], the third inventor's last name is incorrect, it should read

--BRANDT--

Signed and Sealed this

Seventeenth Day of September, 1991

Attest:

HARRY F. MANBECK, JR.

*Attesting Officer*      *Commissioner of Patents and Trademarks*